United States Patent [19]
Hotta

[11] Patent Number: 5,656,916
[45] Date of Patent: Aug. 12, 1997

[54] APPARATUS FOR CONTROLLING THE CURRENTS SUPPLIED FOR BATTERY CHARGING AND AN ELECTRIC LOAD DURING CHARGING OF AN ELECTRIC VEHICLE BATTERY

[75] Inventor: Yoshihiko Hotta, Wako, Japan

[73] Assignee: Honda Giken Kogyo Kabushiki Kaisha, Tokyo, Japan

[21] Appl. No.: 519,576

[22] Filed: Aug. 25, 1995

[30] Foreign Application Priority Data

Aug. 25, 1994 [JP] Japan ................... 6-201165

[51] Int. Cl.$^6$ ............................................. H01M 10/46
[52] U.S. Cl. .............................................. 320/22; 180/65.1
[58] Field of Search .......................... 320/5, 21, 22, 320/31, 39, 48; 180/65.1; 62/209, 230, 243; 165/43

[56] References Cited

U.S. PATENT DOCUMENTS 5,305,613  4/1994  Hotta et al. .
5,371,456  12/1994  Brainard ..................... 320/31

FOREIGN PATENT DOCUMENTS 5147420  6/1993  Japan .

*Primary Examiner*—Edward Tso
*Attorney, Agent, or Firm*—Lyon Lyon LLP

[57] ABSTRACT

When the main battery of an electric vehicle is being charged and any one of an air-conditioner ON/OFF switch, a pre-air-conditioning preference ON/OFF switch, an external-input-controlled timer pre-air-conditioning preference ON/OFF switch, and an external-input-controlled pre-air-conditioning ON/OFF switch is turned on, a charging control device causes the maximum output current from the battery charger to be distributed between the battery and a motor-driven air conditioner or other electric load at a certain ratio on a real-time basis or at a start time established by a pre-air-conditioning timer or a timer in an air-conditioner controller. Therefore, the motor-driven air conditioner or other electric load can be operated and a charging current can be supplied to the battery at the same time even if the rated output capacity of the charger is relatively small. Consequently, the motor-driven air conditioner or other electric load can efficiently be operated while the battery is being charged.

19 Claims, 5 Drawing Sheets ly, to charge
APPARATUS FOR CONTROLLING THE CURRENTS SUPPLIED FOR BATTERY CHARGING AND AN ELECTRIC LOAD DURING CHARGING OF AN ELECTRIC VEHICLE BATTERY

BACKGROUND OF THE INVENTION

1. Field of the Invention

The present invention relates to an apparatus for controlling the charging of a battery, e.g., a 240 V battery, on an electric vehicle which can be propelled to travel on roads by a propulsive motor energized by the battery.

2. Description of the Related Art

There has recently been proposed an electric vehicle which can be propelled to travel on roads by a propulsive motor energizable by a motor inverter to which electric energy is supplied from a battery, e.g., a 240 V battery, on the electric vehicle.

An air-conditioner mounted on the electric vehicle has a motor-driven compressor which can be actuated by an electric motor, referred to as an air-conditioner motor, energizable by an inverter. The inverter has input terminals connected to the battery on the electric vehicle. The air-conditioner with the motor-driven compressor will also be referred to as a motor-driven air conditioner.

On the electric vehicle, both the propulsive motor and the air-conditioner motor are energized by the charged electric energy from the battery. Because the mileage of the electric vehicle, which is based on the capacity of the battery, is shorter than the mileage of an ordinary automobile propelled by an internal combustion engine, which is based on the capacity of the fuel tank, it has been proposed to operate the air-conditioner on the electric vehicle in a pre-air-conditioning mode.

As disclosed in Japanese laid-open patent publication No. 5-147420, the pre-air-conditioning mode is a mode of operation carried out when the propulsive motor is de-energized, e.g., when the electric vehicle is stopped or parked. In the pre-air-conditioning mode, the battery on the electric vehicle is charged by an external power supply through a charger, and the air-conditioner is actuated through the charger while the battery is being charged, so that comfortable levels of temperature and humidity will be achieved in the passenger's compartment or cabin at a boarding time when the driver gets into the electric vehicle.

If the air-conditioner on the electric vehicle is continuously actuated while the electric vehicle is running, the mileage of the electric vehicle is reduced by about 20% because of the burden imposed on the battery by the air-conditioner. In the pre-air-conditioning mode, since the air-conditioner is actuated by electric energy supplied from the external power supply while the battery is being charged, the capacity of the battery is not reduced, and the cabin can be cooled down or heated up before the driver enters the cabin. Therefore, the pre-air-conditioning mode is an effective and useful feature on the electric vehicle.

AC power supplies available at home and business facilities normally are in the form of AC outlets at ratings of 200 V (200 V~240 V)·30 A or 100 V (100 V~117 V)·15 A. For charging the battery on the electric vehicle in a relatively short period of time, such as one or two hours, while the electric vehicle is parked, it is simple to connect the charger to an AC outlet at ratings of 200 V (200 V~240 V)·15 A which is in most widespread use. Because the mileage of the electric vehicle, which is based on the capacity of the battery, is relatively short, it is an effective practice to charge the battery in one or two hours each time the electric vehicle is parked, for extending the mileage.

If the air-conditioner can be operated in the pre-air-conditioning mode while the electric vehicle is parked for such a short period of time, then the cabin can be air-conditioned to a comfortable environment before a boarding time.

The air-conditioner installed on an ordinary 4-wheeled electric vehicle normally has a power consumption rating of about 1.5 kVA, and the charger on the electric vehicle produces an output current of about 15 A. Therefore, when the battery on the electric vehicle is charged, the air-conditioner cannot be operated, and when the air-conditioner is operated, the battery on the electric vehicle cannot be charged.

SUMMARY OF THE INVENTION

It is an object of the present invention to provide an apparatus for controlling the charging of a battery on an electric vehicle such that the battery can be charged and an electric load, such as an air-conditioner, on the electric vehicle can be energized at the same time even if the capacity of an available AC power supply or the output rating of a charger, which may be either a charger on the electric vehicle or an external charger, is relatively low.

Another object of the present invention is to provide an apparatus for controlling the charging of a battery on an electric vehicle such that an electric load on the electric vehicle can be energized in view of a minimum operating current.

Still another object of the present invention is to provide an apparatus for controlling the charging of a battery on an electric vehicle such that the battery can be charged while an electric load on the electric vehicle is being energized with a minimum operating current, and when the charging capacity of the battery reaches a predetermined value, e.g., about 80%, the charging current supplied to the battery is reduced to allow the electric load on the electric vehicle to be energized with an operating current that is greater than the minimum operating current by the reduction in the charging current.

Yet still another object of the present invention is to provide an apparatus for controlling the charging of a battery on an electric vehicle such that the battery can be charged and an air-conditioner (or a seat heater, a heating/cooling cabinet, a rear window defroster in the form of a printed resistive wire, a fan for cooling the battery, or a heater for heating the battery) can be energized at the same time even if the capacity of an available AC power supply or the output rating of a charger is relatively low, A further object of the present invention is to provide an apparatus for controlling the charging of a battery on an electric vehicle such that, when a timer-controlled pre-air-conditioning preference mode is turned on by a remote control key, the battery is continuously charged, and an air-conditioner is operated with the maximum capability of the charger for several minutes immediately before boarding, so that the cabin will be comfortable upon boarding.

According to the present invention, there is provided an apparatus for controlling the charging of a battery on an electric vehicle with a charger which is energizable by an external power supply, comprising charger maximum output current determining means for determining a maximum output current which can be produced by the charger, and charging control means connected to the charger and the charger maximum output current determining means, for distributing the maximum output current between the battery and an electric load on the electric vehicle when the electric load is to be operated while the battery is being charged.

The above and other objects, features, and advantages of the present invention will become apparent from the following description when taken in conjunction with the accompanying drawings in which a preferred embodiment of the present invention is shown by way of example.

DETAILED DESCRIPTION OF THE PREFERRED EMBODIMENT

Figure 1:
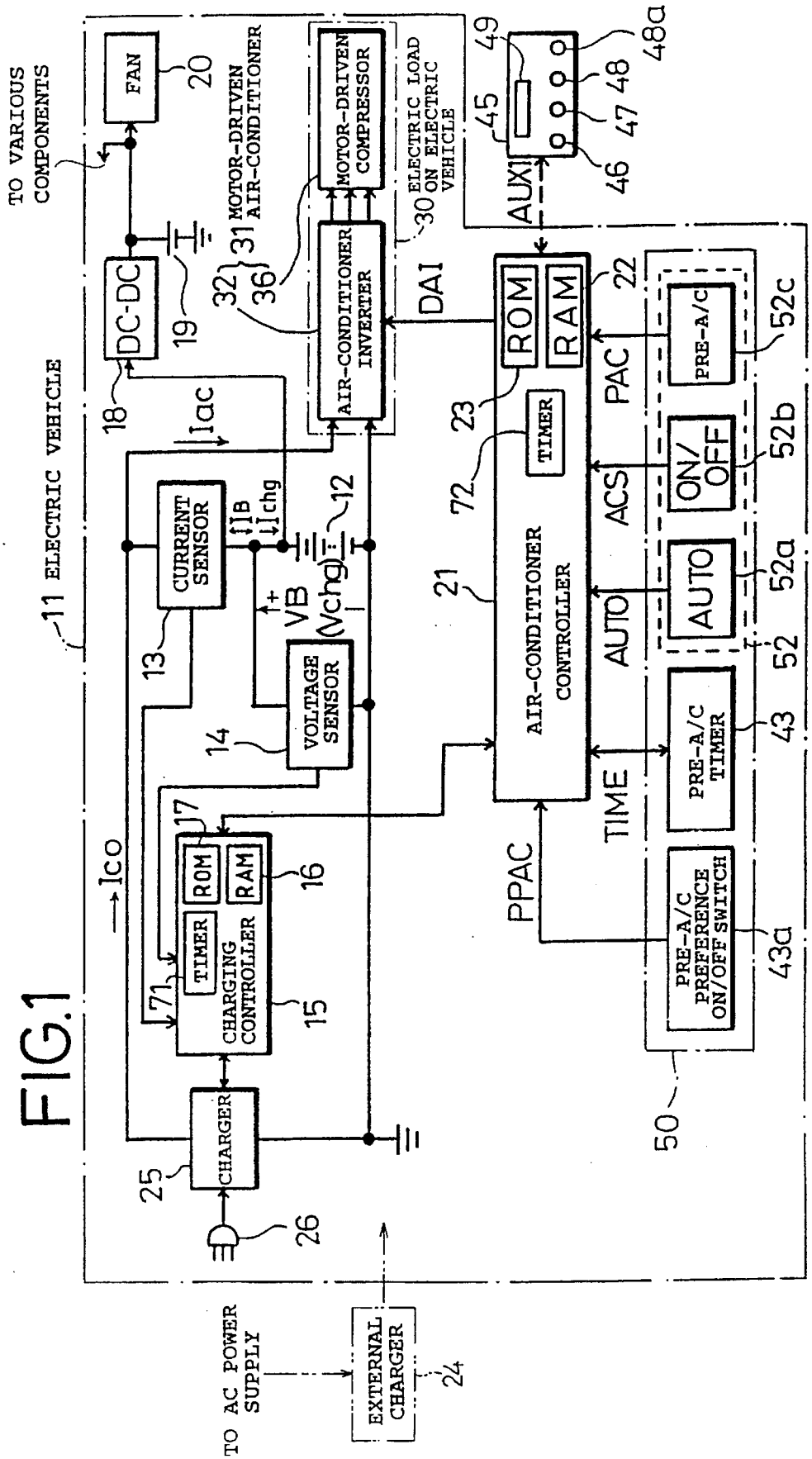
FIG. 1 is a block diagram of an apparatus for controlling the charging of a battery on an electric vehicle according to the present invention.

FIG. 1 shows in block form an apparatus for controlling the charging of a battery on an electric vehicle according to the present invention.

As shown in FIG. 1, an electric vehicle 11 has a high-voltage battery 12 of +240 V, for example. A current sensor 13 for detecting a current (hereinafter referred to as a "battery current") IB flowing in the battery 12 is connected in series to the battery 12, and a voltage sensor 14 for detecting a voltage (hereinafter referred to as a "battery voltage") VB across the battery 12 is connected parallel to the battery 12. The capacity of the battery 12 can be estimated from the battery voltage VB, an integrated value of input and output currents of the battery 12, and the temperature of the battery 12. The battery current IB flowing while the battery 12 is being charged will also be referred to as a "charging current Ichg", and the battery voltage VB developed while the battery 12 is being charged will also be referred to as a "charging voltage Vchg".

A DC-to-DC converter 18 is connected across the battery 12. The DC-to-DC converter 18 has sn output terminal connected to a low-voltage battery 19 of +12 V, for example. The low-voltage battery 19 applies its low voltage to a fan 20 for cooling the battery 12, a charging controller 15, sn sir-conditioner inverter 82, and an air-conditioner controller 21.

The battery current IB detected by the current sensor 13 and the battery voltage VB detected by the voltage sensor 14 are stored in a RAM (random-access memory) 16 of the charging controller 15, and, if necessary, are also stored in a RAM 22 of the sir-conditioner controller 25 through the charging controller 15.

The charging controller 15 and the air-conditioner controller 21 have respective CPUs (central processing units), respective ROMs (read-only memories) 17, 23, the respective RAMs 16, 22 as work memories, respective timers 71, 72, and respective interfaces. The data stored by the RAMs 16, 22 are backed up by the low-voltage battery 19. The charging controller 15 and the air-conditioner controller 21 may be in the form of microcomputers.

The charging controller 15 is connected to a control terminal of a charger 25 mounted on the electric vehicle 11. The charger 25 has an input terminal which will be connected through a plug 26 to an AC outlet at home, for example, when the battery 12 is to be charged.

The charger 25 has a positive (+) DC output terminal connected to a positive (+) terminal of the battery 12 through the current sensor 13 and a positive (+) terminal of the air-conditioner inverter 32, which constitutes part of an electric load 30, and a negative (−) terminal (ground terminal) connected to a negative (−) terminal of the voltage sensor 14, a negative (−) terminal of the battery 12, and a negative (−) terminal of the air-conditioner inverter 32. A current outputted from the charger 25 is referred to as a "charger output current Ico". A current supplied to the air-conditioner inverter 32 is referred to as an "air-conditioner consumption current (or an air-conditioner operating current) Iac".

The air-conditioner inverter 32 has three-phase output terminals connected to a three-phase motor (not shown separately) in a motor-driven compressor 36, which constitutes part of an electric load 30. The three-phase motor has a rotatable shaft connected to the rotatable shaft of the motor-driven compressor 36. The air-conditioner inverter 32, the motor-driven compressor 36, and a coolant circuit (not shown) jointly serve as a motor-driven air-conditioner 31.

The air-conditioner inverter 32 has a control terminal supplied with an air-conditioner inverter drive signal DAI from the air-conditioner controller 21. The air-conditioner inverter drive signal DAI is a pulse-width-modulated signal which is a duty-ratio signal.

To the air-conditioner controller 21, there are connected a control panel 50 positioned on or near the dashboard of the electric vehicle and a remote control key 45 through radio signals such as radio waves or infrared signals. The control panel 50 includes a pre-air-conditioning timer 43 and an air-conditioner switch set 52. The remote control key 45 has a pre-air-conditioning mode switch 46 for setting a cooling mode or a heating mode, an external-input-controlled pre-air-conditioning ON/OFF switch 47, an external-input-controlled timer pre-air-conditioning ON/OFF switch 48 for externally turning on and off the pre-air-conditioning timer 43, an external-input-controlled timer pre-air-conditioning preference ON/OFF switch 48a, a liquid-crystal display (LCD) unit 49 for displaying an operating condition of the motor-driven air-conditioner 31, and a door lock/unlock switch (not shown) for locking and unlocking the doors of the electric vehicle. An air-conditioner operation permission confirmation signal AUX1 transmitted from the remote control key 45 to the air-conditioner controller 21 comprises a duty-ratio signal. The air-conditioner controller 21 confirms, depending on the duty ratio of the air-conditioner operation permission confirmation signal AUX1, whether the air-conditioner operation permission confirmation signal AUX1 is a signal produced when the external-input-controlled timer pre-air-conditioning ON/OFF switch 48 is operated or a signal produced when the external-input-controlled pre-air-conditioning ON/OFF switch 47 is operated.

Figure 2:
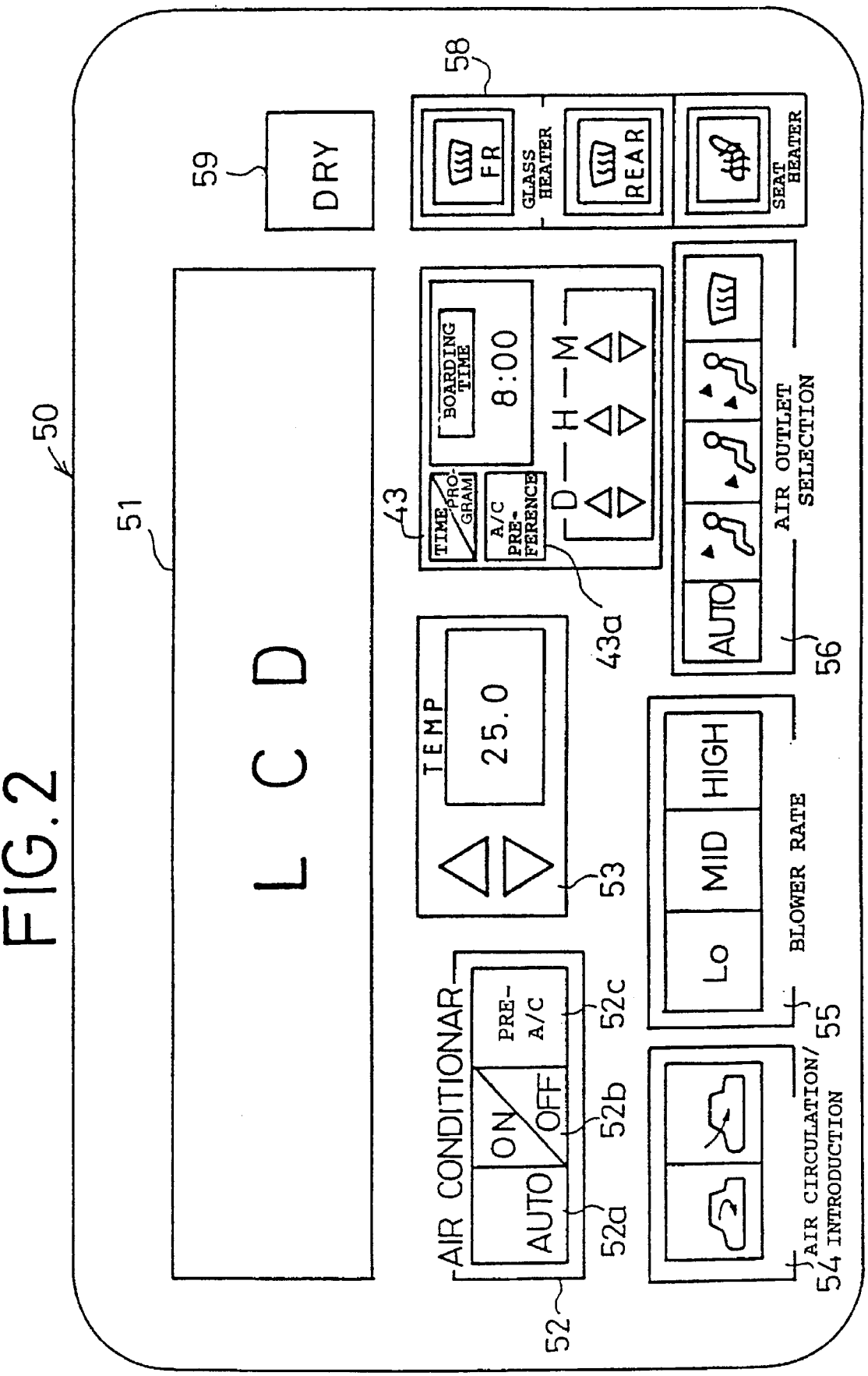
FIG. 2 is a front elevational view of a control panel in the apparatus shown in FIG. 1.

FIG. 2 shows the control panel 50 in greater detail. As shown in FIG. 2, the control panel 50 has an LCD panel 51 for displaying a cabin temperature detected by a temperature sensor (not shown) and a cabin humidity detected by a humidity sensor (not shown), the air-conditioner switch set 52, a temperature setting switch 53, an air circulation/introduction selection switch set 54, an air blower rate selection switch set 55, an air outlet selection switch set 56, the pre-air-conditioning timer 43, a heater selection switch set 58, and a dehumidifier switch 59.

The air-conditioner switch set 52 comprises an automatic operation switch 52a, an air-conditioner ON/OFF switch 52b, and a pre-air-conditioning ON/OFF switch 52c. Each time the automatic operation switch 52a is operated, the motor-driven air-conditioner 31 switches between automatic and manual control modes (operation modes), and a signal indicative of either one of the automatic and manual control modes is supplied as an air-conditioner automatic/manual switching signal AUTO to the air-conditioner controller 21. The air-conditioner ON/OFF switch 52b supplies an air-conditioner ON/OFF signal ACS for turning on or off the motor-driven air-conditioner 31 to the air-conditioner controller 21. When the pre-air-conditioning ON/OFF switch 52c is operated, it supplies a pre-air-conditioning ON/OFF signal PAC for turning on or off a pre-air-conditioning mode to the air-conditioner controller 21.

The pre-air-conditioning timer 43 is used to establish a time at which to start the motor-driven air-conditioner 31 and a period of time for which the motor-driven air-conditioner 31 is to operate continuously for making the cabin of the electric vehicle comfortable at a scheduled boarding time. The pre-air-conditioning timer 43 has an initial timer setting (default value) for operating the motor-driven air-conditioner 31 for 30 minutes, for example, prior to a scheduled boarding time. The time at which to start the motor-driven air-conditioner 31 and the period of time for which the motor-driven air-conditioner 31 is to operate continuously can be established on the control panel 50. The pre-air-conditioning timer 43 on the control panel 50 has UP/DOWN keys indicated respectively by "D", "H" and "M" for setting "day", "hour" and "minute", respectively. Using these UP/DOWN keys on the control panel 50, the driver of the electric vehicle can set a scheduled boarding time that is displayed, such as, for example, "8:00" (which is a 24-hour indication meaning 8:00 AM).

The pre-air-conditioning timer 43 includes a pre-air-conditioning preference ON/OFF switch 43a for turning on the pre-air-conditioning timer 43. When the pre-air-conditioning timer 43 is turned on by the pre-air-conditioning preference ON/OFF switch 43a, the motor-driven compressor 36 preferentially operates, for example, for 5 minutes (default value) prior to a scheduled boarding time.

The pre-air-conditioning timer 43 supplies the air-conditioner controller 21 with a signal (hereinafter referred to as a "pre-air-conditioning timer signal") TIME (see FIG. 1) indicative of times to start and stop operating the motor-driven air-conditioner 31 which are established by the pre-air-conditioning timer 43. The air-conditioner controller 21 is also supplied with a pre-air-conditioning preference ON/OFF signal PPAC from pre-air-conditioning preference ON/OFF switch 43a when it is operated.

The motor-driven air-conditioner 31 operates selectively in four control modes (operation modes), i.e., a normal air-conditioning control mode, an external-input-controlled pre-air-conditioning control mode, a timer-controlled pre-air-conditioning control mode, and a timer-controlled pre-air-conditioning preference control mode. In the normal air-conditioning control mode, the motor-driven air-conditioner 31 is turned on or off on a real-time basis, i.e., immediately, when the air-conditioner ON/OFF switch 52b on the control panel 50 is operated. In the external-input-controlled pre-air-conditioning control mode, the motor-driven air-conditioner 31 is turned on or off on a real-time basis by the external-input-controlled pre-air-conditioning ON/OFF switch 47 on the remote control key 45 (the motor-driven air-conditioner 31 operates for five minutes, for example, after it is turned on in this mode). In the timer-controlled pre-air-conditioning control mode, the motor-driven air-conditioner 31 is turned on at a time established by the pre-air-conditioning timer 43 by the pre-air-conditioning ON/OFF switch 52c or the external-input-controlled timer pre-air-conditioning ON/OFF switch 48 (the motor-driven air-conditioner 31 operates for 30 minutes, for example, prior to a scheduled boarding time in this mode). In the timer-controlled pre-air-conditioning preference control mode, the motor-driven air-conditioner 31 is caused to operate for five minutes, for example, prior to a scheduled boarding time by the pre-air-conditioning preference ON/OFF switch 43a or the external-input-controlled timer pre-air-conditioning preference ON/OFF switch 48a.

The timer-controlled pre-air-conditioning preference control mode is useful if activated when the battery 12 is charged by an AC power supply of a facility, such as a restaurant, for example, while the driver of the electric vehicle is having lunch at the restaurant.

Operation of the apparatus according to the present invention will be described below with reference to FIGS. 3A through 3C, 4, and 5A through 5C.

Figure 3A:
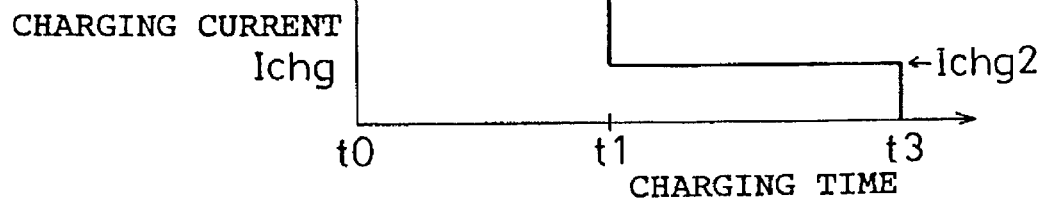
FIG. 3A is a diagram showing a specified charging current supplied by a charger on an electric vehicle.

FIG. 3A shows by way of example charging current characteristics stored in the ROM 17 for a two-stage constant-current charging process (full-period constant-current charging process). Specifically, the battery 12 is charged with a relatively large first-stage charging current Ichg1 from a time t0 until a time t1 at which the capacity of the battery 12 is of about 80%, and, after the time t1, the battery 12 is charged with a relatively small second-stage charging current Ichg2 until a time t3 at which the battery 12 is fully charged. The battery 12 may be charged with the relatively small second-stage charging current Ichg2 under a constant voltage.

Figure 3B:
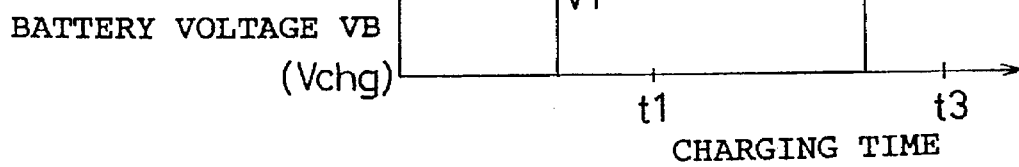
FIG. 3B is a diagram showing the manner in which the voltage across a battery varies when the battery is charged.

FIG. 3B shows battery voltage characteristics corresponding to the charging current characteristics shown in FIG. 3A. Since the battery voltage characteristics shown in FIG. 3B vary with time depending on the ambient temperature of the battery 12, the battery voltage characteristics at respective ambient temperatures are stored in the ROM 17 and the stored battery voltage characteristics are updated with time. The ROM 17 may comprise an EEPROM, an EAROM, or the like which allows stored data to be rewritten. The battery voltage characteristics may be stored in the RAM 16 and backed up. The RAM 16 may comprise a rewritable minidisk which does not need to be backed up, a magnetic disk such as a floppy disk, an optical magnetic disk, or a magnetic card.

As can be seen from FIGS. 3A and 3B, a relatively large first-stage charging current Ichg1 (equal to a charger maximum output current Icomax) is supplied as the charging current Ichg to the battery 12 from the time t0 until the time t1 at which the battery voltage VB reaches a predetermined battery voltage V1, e.g., a voltage corresponding to about 80% of the fully charged capacity of the battery 12). After the time t1, a relatively small second-stage charging current Ichg2 is supplied as the charging current Ichg to the battery 12 until a time t3 at which the battery 12 is fully charged. This charging process is referred to as a two-stage constant-current charging process. In the two-stage constant-current charging process, the charging current Ichg1 is referred to as a first-stage charging current, and the charging current Ichg2 as a second-stage charging current. The fully charged time t3 is determined either as the time at which the battery voltage VB reaches a peak voltage V2 or based on an integrated value of charging currents.

The first-stage charging current Ichg1 and the second-stage charging current Ichg2 are of values established according to the characteristics of the battery 12. For example, if the battery 12 is discharged by about 80% of its full capacity and the first-stage charging current Ichg1 is set to a current corresponding to 0.2 C (C is a rated capacity and expressed in [AH]), then the period of time from the time t0 up to the time t1 is in the range of from 3 to 4 hours. If the second-stage charging current Ichg2 is set to a current corresponding to 0.05 C, for example, then the period of time from the time t1 up to the time t3 is about 4 hours.

Figure 3C:
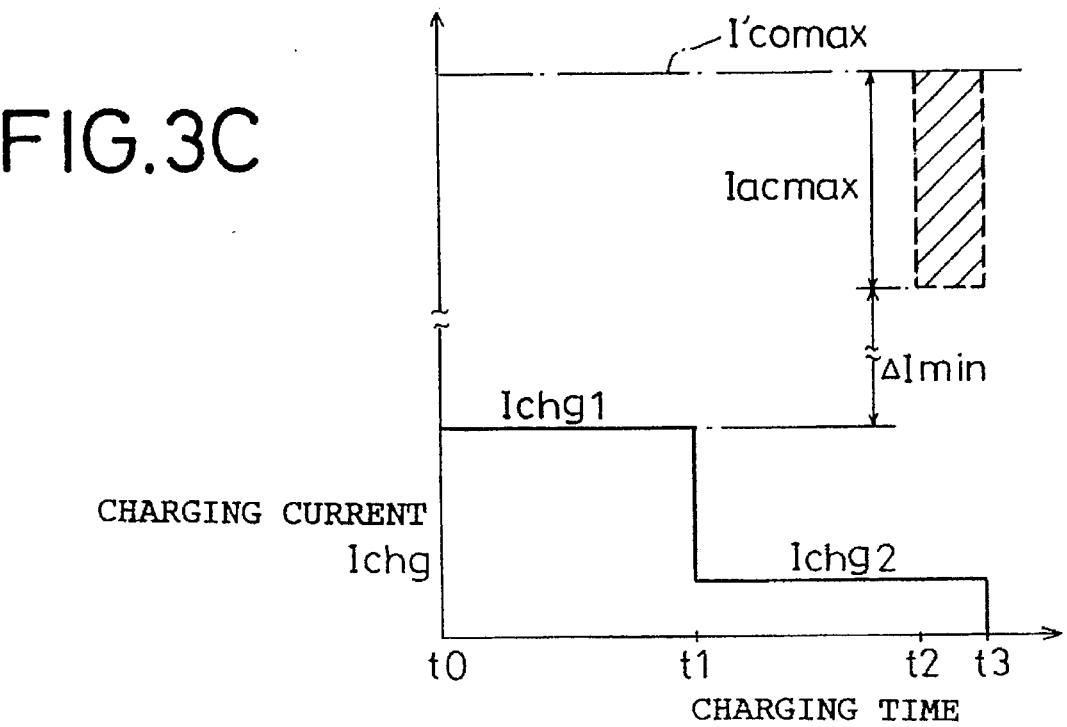
FIG. 3C is a diagram illustrative of a pre-air-conditioning mode in a three-stage constant-current charging process.

FIG. 3C shows an ordinary pre-air-conditioning mode in a three-stage constant-current charging process.

A charger having a relatively large output rating, such as an external charger 24 (see FIG. 1) installed in a charging station or the like, is connected to an AC outlet at ratings of 200 V (200 V~240 V)·30 A. The external charger 24 has a maximum output current I'comax which is about four times the first-stage charging current Ichg1 or greater. The motor-driven air-conditioner 31 has a rated output current (maximum operating current) Iacmax which is substantially equal to the first-stage charging current Ichg1. Therefore, while the battery 12 is being charged with the external charger 24, the motor-driven air-conditioner 31 can be operated at any time from the time t0 to the time t3. A minimum marginal current ΔImin is indicated by ΔImin= I'comax−Ichg1−Iacmax.

Figure 4:
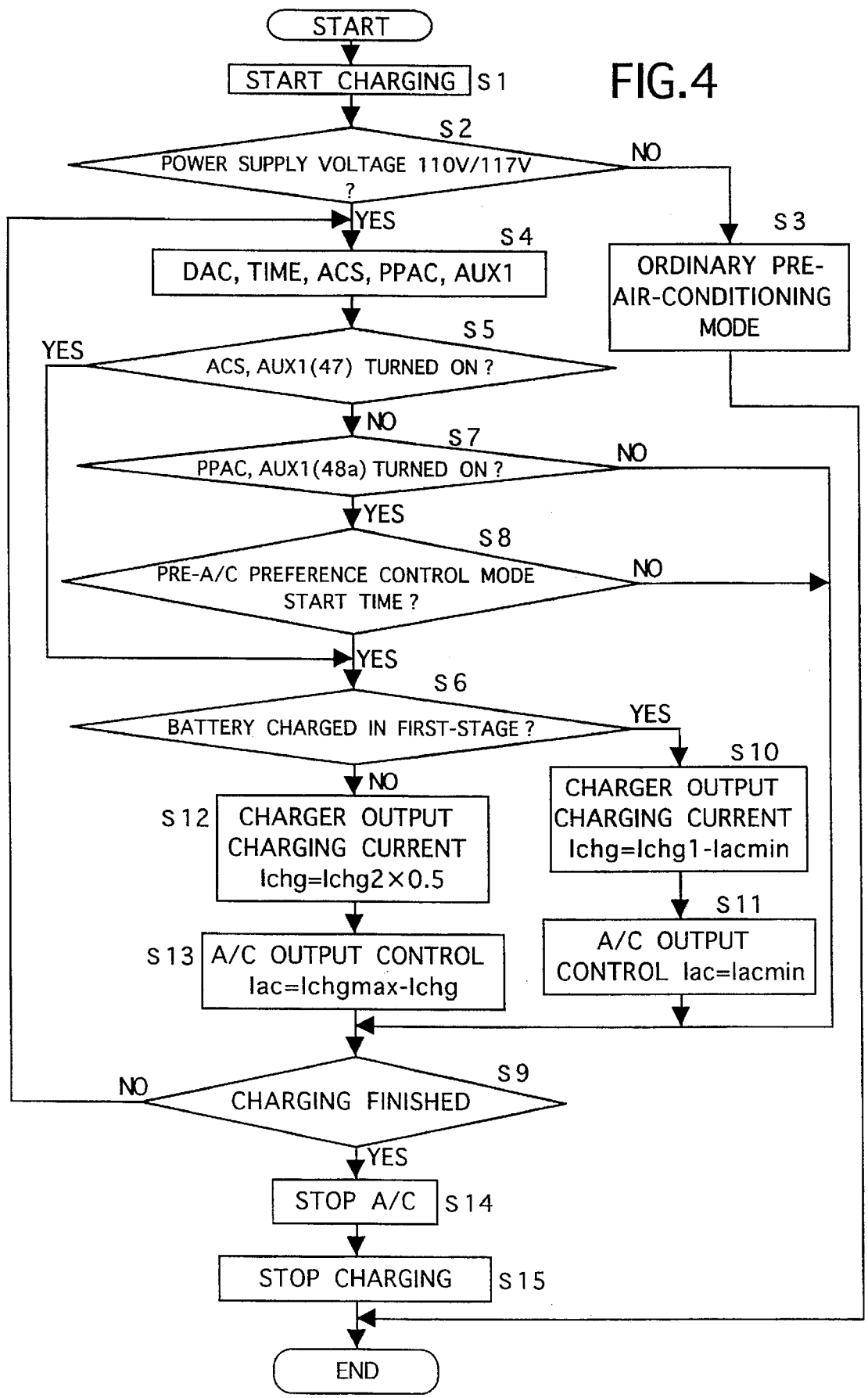
FIG. 4 is a flowchart of an operation sequence of the apparatus shown in FIG. 1.

FIG. 4 shows an operation sequence of the apparatus according to the present invention. The operation sequence shown in FIG. 4 represents operation of both the charging controller 15 and the air-conditioner controller 21. Since the charging controller 15 and the air-conditioner controller 21 are connected to each other by a communication line, however, the operation sequence may be carried out by either the charging controller 15 or the air-conditioner controller 21. The charging controller 15 and the air-conditioner controller 21 may be integrally combined with each other.

In FIG. 4, when the plug 26 is connected to the AC power supply as confirmed by the charging controller 15 through the charger 25, the charging controller 15 confirms the battery voltage VB and starts charging the battery 12 with the charging current Ichg1 in the first stage in a step S1. The time t0 at which the battery 12 starts being charged is stored in the RAM 16 of the charging controller 15. The timer 71 of the charging controller 15 starts measuring charging time.

A step S2 determines whether the voltage of the AC power supply to which the plug 26 is connected is of 100 V (100 V~117 V) or not. If not ("NO" in the step S2), then since the voltage of the AC power supply is of 200 V (200 V~240 V), the AC power supply can supply additional electric energy, and the motor-driven air-conditioner 31 is operated in the ordinary pre-air-conditioning mode shown in FIG. 3C in a step S3.

If the voltage of the AC power supply is of 100 V (100 V~117 V) ("YES" in the step S2), then statuses of the pre-air-conditioning ON/OFF signal PAC, the pre-air-conditioning timer signal TIME (the scheduled boarding time and the period of time for which the motor-driven air-conditioner 31 is to be operated), the air-conditioner ON/OFF signal ACS, the pre-air-conditioning preference ON/OFF signal PPAC, and the air-conditioner operation permission confirmation signal AUX1 are read from the RAM 22 of the air-conditioner controller 21 into the RAM 16 of the charging controller 15 by an interrupt process carried out at certain time intervals in a step S4. The statuses of these signals PAC, TIME, ACS, PPAC, AUX1 are also read from the corresponding switches into the RAM 22 of the air-conditioner controller 21 by an interrupt process carried out at certain time intervals.

Depending on the read statuses of the signals PAC, TIME, ACS, PPAC, AUX1, it is determined in a step S5 whether the air-conditioner ON/OFF signal ACS is turned on, e.g., of a high level, or not, and the air-conditioner operation permission confirmation signal AUX1 is turned on, i.e., represents a turned-on condition of the external-input-controlled pre-air-conditioning ON/OFF switch 47, or not.

If either of the signals ACS, AUX1 are turned on ("YES" in the step S5), then control jumps to a step S6.

If both the signals ACS, AUX1 are turned off ("NO" in the step S5, then it is determined in a step S7 whether the pre-air-conditioning preference ON/OFF signal PPAC is turned on, and the air-conditioner operation permission confirmation signal AUX1 is turned on, i.e., represents a turned-on condition of the external-input-controlled timer pre-air-conditioning preference ON/OFF switch 48a, or not.

If either of the signals PPAC, AUX1 are turned on ("YES" in the step S7), then it is determined in a step S8 whether or not a time to start operating the motor-driven air-conditioner 31 in the timer-controlled pre-air-conditioning mode or a time to start operating the motor-driven air-conditioner 31 in the timer-controlled pre-air-conditioning preference control mode has been reached. If the time has been reached, control proceeds to the step S6.

If both the signals PPAC, AUX1 are turned off ("NO" in the step S7), or if the time has not been reached ("NO" in the step S8), then it is determined in a step S9 whether the battery 12, for example, has been fully charged or not. If not fully charged ("NO" in the step S9), then control returns to the step S4. Until "YES" is determined from the steps S5, S7, S8, the output current Ico from the charger 25 is used as the charging current Ichg and a current for energizing a load connected to the DC-to-DC converter 18. The charging process in the step S9 can also be judged as being completed when the battery 12 is fully charged, the time measurement by a protective timer is finished, the plug 26 is pulled out of the outlet intentionally by the user of the electric vehicle, the supply of electric energy is stopped upon elapse of a night time zone available for cheaper electric energy, or a power supply failure.

When "YES" is determined from the steps S5, S8, i.e., if the motor-driven air-conditioner 31 is to start operating immediately on a real-time basis or under the control of the timer 72, the step S6 determines whether the battery 12 is being charged in the first stage or not according to a predetermined control sequence of the charger 25.

Figure 5A:
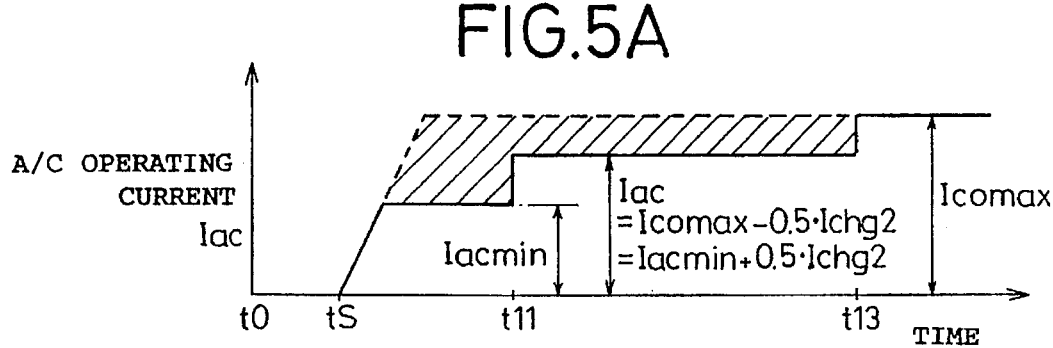
FIG. 5A is a diagram showing how an operating current for operating the air-conditioner varies in the operation sequence of the apparatus shown in FIG. 1.
Figure 5B:
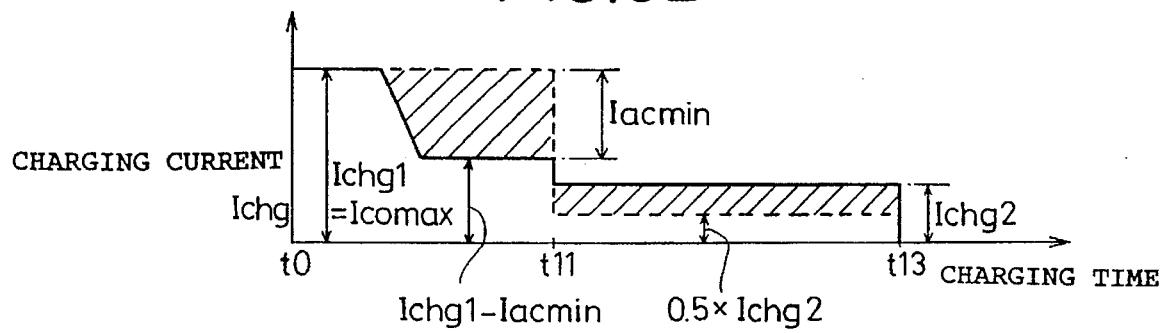
FIG. 5B is a diagram showing how a charging current varies in the operation sequence of the apparatus shown in FIG. 1.
Figure 5C:
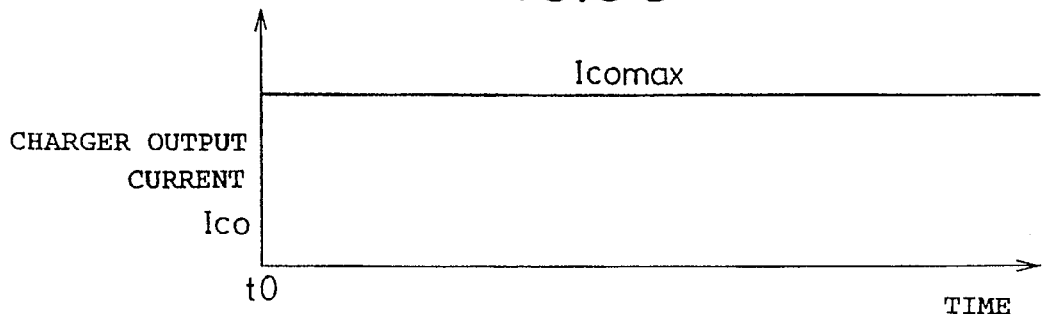
FIG. 5C is a diagram showing an output current from the charger in the operation sequence of the apparatus shown in FIG. 1.

If the battery 12 is being charged in the first stage ("YES" in the step S6), i.e., between times t0 and t11 in FIGS. 5A and 5B, the first-stage charging current Ichg1 (equal to a charger maximum output current Icomax) is reduced at a time tS when the motor-driven air-conditioner 31 starts operating, and the charging current Ichg is established according to the following equation (1) in step S10:

$$Ichg = Icomax - Iacmin \quad (1)$$

where Iacmin is an operable minimum current corresponding to an operable minimum electric energy with which the motor-driven compressor 36 (the motor-driven air-conditioner 31) can operate. The minimum electric energy is a value inherent in the motor-driven compressor 36, which is 0.5 kW and the operable minimum current is of 5 A (assuming a nominal voltage of 100 V) when the motor-driven compressor 36 operates with 0.5 kW or higher if the motor-driven air-conditioner 31 has an output rating of 1.5 kW.

The air-conditioner inverter 32 is supplied with an air-conditioner inverter drive signal DAI having a duty ratio which makes the upper limit of the air-conditioner operating current Iac equal to the operable minimum current Iacmin in a step S11.

If the first-stage charging process is finished in the step S6 ("NO" in the step S6), then the battery 12 has been charged to about 80% of its full capacity.

In the period from a time t11 (see FIGS. 5A and 5B) when the first-stage charging process is finished to a time t13 when the battery 12 is fully charged, the charging current Ichg is reduced to 50% of the second-stage charging current Ichg2 in a step S12. Therefore, the air-conditioner operating current Iac increases by an amount corresponding to the reduction in the charging current Ichg. The air-conditioner inverter 32 is supplied with an air-conditioner inverter drive signal DAI having a duty ratio corresponding to the increased air-conditioner operating current Iac in a step S13.

During the period of the second-stage charging process (from the time t11 to the time t13), the motor-driven air-conditioner 31 is supplied with the air-conditioner operating current Iac that is expressed by the following equation (2):

$$Iac = Iacmin + 0.5 \, Ichg2 \quad (2)$$
$$= Icomax - 0.5 \, Ichg2.$$

After the time t13 when the second-stage charging process is finished, i.e., after the battery 12 has been fully charged, all the charger maximum output current Icomax can be used as the conditioner operating current Iac. The coefficient, indicated as 0.5 above, for the second-stage charging current Ichg2 may be set to a suitable value ranging from 0.2 to 0.3, for example, depending on the air-conditioning capability of the electric vehicle and the charging capability of the charger.

The steps S4 through S13 are successively carried out, and when the completion of the entire charging process is confirmed in the step S9 and the end of the charging control is detected ("YES" in the step S9), the operation of the motor-driven air-conditioner 31 by the air-conditioner controller 21 is stopped in a step S14, and then the charging control by the charging controller 15 is stopped in a step S15.

While the above embodiment is described as being incorporated in the electric vehicle 11 which has the charger 25 mounted thereon, the principles of the present invention are also applicable to an electric vehicle whose battery can be charged by an outside charger, i.e., the external charger 24.

According to the present invention, as described above, when any one of the air-conditioner ON/OFF switch 52b, the pre-air-conditioning preference ON/OFF switch 43a, the external-input-controlled timer pre-air-conditioning preference ON/OFF switch 48a, and the external-input-controlled pre-air-conditioning ON/OFF switch 47 is turned on while the battery 12 is being charged, the motor-driven air conditioner 31 is controlled in coordination with the charging process on a real-time basis or at the start time tS established by the pre-air-conditioning timer 43 or the timer 72 in the air-conditioner controller 21. Therefore, the motor-driven air conditioner 31 can be operated in the pre-air-conditioning mode and a charging current can be supplied to the battery 12 efficiently within a current range not exceeding the maximum rating of the charger 25 or the external charger 24.

In a practical application, when the battery 12 is charged by an AC power supply of a facility such as a restaurant, for example, while the driver of the electric vehicle is having lunch at the restaurant, the period of time available for charging the battery 12 ranges from one hour to two hours. In this period of time, the user of the electric vehicle can keep the battery 12 continuously charged, and have the motor-driven air-conditioner 31 operated for several minutes, e.g., five minutes, immediately prior to a scheduled boarding time, with the AC power supply, utilizing the maximum ability (charger maximum output current) of the charger 25. Consequently, a comfortable environment can be created in the cabin without substantially reducing the capacity of the battery 12, i.e., while minimizing any reduction of the mileage of the electric vehicle.

In the above embodiment, the motor-driven air-conditioner 31 is operated as the electric load 30 on the electric vehicle. However, the electric load 30 on the electric vehicle is not limited to the motor-driven air-conditioner 31, but may be a seat heater, a heating/cooling cabinet, a rear window defroster in the form of a printed resistive wire, the fan 20 for cooling the battery 12 at high temperatures, or a heater for heating the battery 12 at low temperatures. While the air-conditioner operation permission confirmation signal AUX1 has been described and shown as being transmitted from the remote control key 45, the air-conditioner operation permission confirmation signal AUX1 may be transmitted from a radio telephone set such as a portable telephone set.

As described above, when an electric load on an electric vehicle is to be started while a battery on the electric vehicle is being charged, even if the capacity of an AC power supply connected to the electric vehicle is relatively small or the rated output capacity of a charger for charging the battery is relatively small, the battery can be charged and the electric load on the electric vehicle can be operated at the same time because the maximum output current of the charger is distributed between the battery and the electric load at a certain ratio.

Although a certain preferred embodiment of the present invention has been shown and described in detail, it should be understood that various changes and modifications may be made therein without departing from the scope of the appended claims.

What is claimed is:

1. An apparatus for controlling the charging of a battery on an electric vehicle with a charger which is energizable by an external power supply, comprising:

an electrical load used in said electrical vehicle, said electrical load normally operating at a demand current;

electrical load operating demand means for demanding operation of said electrical load at said demand current;

detecting means for detecting whether a power supply line of said charger is a high voltage power supply line or a low voltage power supply line;

charger maximum output current determining means for determining a maximum output current which can be produced by the charger; and charging control means connected to the charger and said charger maximum output current determining means for controlling said charger such that, when the battery is being charged by said low voltage power supply line and a power supply to said electrical load is demanded, said electrical load is controlled at an operating current which is lower than said demand current, and the battery is charged at an electrical current which is diminished from the maximum output current of said charger by said operating current.

2. An apparatus according to claim 1, wherein said operating current supplied to the electric load is at least an operable minimum current with which the electric load is operable.

3. An apparatus according to claim 2, further comprising battery capacity determining means connected to said charging control means, said charging control means reducing a charging current supplied to the battery at a time when the battery is charged to a predetermined capacity, continuously charging the battery with the reduced charging current, and operating the electric load with an increased current from said time.

4. An apparatus according to claim 3, wherein said predetermined capacity is approximately 80% of a full capacity of the battery.

5. An apparatus according to any one of claims 1 through 3, wherein said electric load comprises a motor-driven air-conditioner.

6. An apparatus according to any one of claim 1 through 3, wherein said electric load comprises a motor-driven air-conditioner, further comprising a remote control key connected to said charging control means through radio signals, said remote control key having an external-input-controlled timer pre-air-conditioning preference ON/OFF switch which, when turned on, controls said charging control means to continuously charge the battery and operate the motor-driven air-conditioner with a maximum capability limit of the charger several minutes prior to boarding the electric vehicle.

7. An apparatus according to claim 1 wherein the charger comprises a charger mounted on the electric vehicle.

8. An apparatus according to claim 1, wherein the charger comprises an external charger outside of the electric vehicle.

9. An apparatus according to claim 1, wherein the electric load comprises a seat heater on the electric vehicle.

10. An apparatus according to claim 1, wherein the electric load comprises a heating/cooling cabinet on the electric vehicle.

11. An apparatus according to claim 1, wherein the electric load comprises a rear window defroster in the form of a printed resistive wire.

12. An apparatus according to claim 1, wherein the electric load comprises a fan for cooling the battery at high temperatures.

13. An apparatus according to claim 1, wherein the electric load comprises a fan for heating the battery at low temperatures.

14. An apparatus according to claim 3, wherein said charging control means reduces the charging current below a normal charging current after the battery is charged to said predetermined capacity when the electric load is operated.

15. An apparatus for controlling the charging of a battery on an electric vehicle with a charger which is energizable by an external power supply, comprising:

an electrical load used in said electrical vehicle, said electrical load normally operating at a demand circuit;

electrical load operating demand means for demanding operation of said electrical load at said demand current;

charger ability detecting means for determining a maximum current that can be output from said charger, and for detecting when said maximum current is lower than a prescribed value which is derived from a present battery charging current and the electrical load demand current during charging of said battery; and charging control means connected to the charger and said charger ability detecting means for controlling said charger such that, during charging when said charger ability detecting means detects that said maximum current is lower than said prescribed amount and power supply to said electrical load is demanded, said electrical load is controlled at an operating current which is lower than said demand current, and the battery is charged at an electrical current which is diminished from said maximum current of said charger by said operating current.

16. An apparatus according to claim 15, wherein said operating current supplied to the electric load is at least an operable minimum current with which the electric load is operable.

17. An apparatus according to claim 15, further comprising battery capacity determining means connected to said charging control means, for reducing a charging current supplied to the battery at a time when the battery is charged to a predetermined capacity, continuously charging the battery with the reduced charging current, and operating the electric load with an increased current from said time.

18. An apparatus according to claim 17, wherein said operating current to the electric load is at least an operable minimum current with which the electric load is operable.

19. An apparatus according to claim 17 or 18, wherein said charging control means reduces the charging current below a normal charging current after the battery is charged to said predetermined capacity when the electric load is operated.

* * * * *

UNITED STATES PATENT AND TRADEMARK OFFICE
CERTIFICATE OF CORRECTION

PATENT NO. : 5,656,916
DATED : August 12, 1997
INVENTOR(S) : Hotta

It is certified that error appears in the above-identified patent and that said Letters Patent is hereby corrected as shown below:

Column 12,
Line 14, the word "circuit" should be changed to -- current --.
Line 46, after the word "current" insert the word -- supplied --.

Signed and Sealed this

Eleventh Day of June, 2002

*Attest:*

*Attesting Officer*

JAMES E. ROGAN
*Director of the United States Patent and Trademark Office*